(12) United States Patent
Itoh

(10) Patent No.: US 6,343,868 B1
(45) Date of Patent: Feb. 5, 2002

(54) SHEET-LIKE LIGHT SOURCE DEVICE

(75) Inventor: Atsushi Itoh, Kumamoto (JP)

(73) Assignee: Advanced Display Inc., Kikuchi-gun (JP)

( * ) Notice: Subject to any disclaimer, the term of this patent is extended or adjusted under 35 U.S.C. 154(b) by 0 days.

(21) Appl. No.: 09/656,272

(22) Filed: Sep. 6, 2000

(30) Foreign Application Priority Data

Sep. 9, 1999 (JP) ............................................ 11-255773

(51) Int. Cl.$^7$ ................................................. F21V 7/04
(52) U.S. Cl. ............................ 362/31; 362/26; 362/347; 362/296
(58) Field of Search ............................. 362/31, 26, 320, 362/347, 343, 296, 341

(56) References Cited

U.S. PATENT DOCUMENTS 5,997,148 A * 12/1999 Ohkawa ....................... 362/31
6,049,649 A * 4/2000 Arai ............................ 385/133
6,288,761 B1 * 9/2001 Kanatsu ....................... 349/65

* cited by examiner

Primary Examiner—Sandra O'Shea
Assistant Examiner—Ronald E. DelGizzi
(74) Attorney, Agent, or Firm—Oblon, Spivak, McClelland, Maier & Neustadt, P.C.

(57) ABSTRACT

A sheet-like light source device of side-light type comprising a light-conducting plate, at least one rod-like light source disposed proximate to a light-incident surface, a tubular reflecting member covering portions other than a surface facing the light-conducting plate of the rod-like light source, and a planar reflecting member disposed proximate to a position facing a rear surface of the light-conducting plate. An end portion of the planar reflecting member is projecting out from an end portion of the light-conducting plate within the tubular reflecting member, and the projecting end portion of the planar reflecting member is bent in a parting direction from the rod-like light source. It is possible to prevent degradations in display qualities owing to anomalous emission without degrading the brightness thereof.

6 Claims, 6 Drawing Sheets

SHEET-LIKE LIGHT SOURCE DEVICE

BACKGROUND OF THE INVENTION

The present invention relates to a sheet-like light source device. More particularly, it relates to a sheet-like light source device which is employed as a backlight of a liquid crystal display device, wherein the sheet-like light source device is capable of preventing degradations in display qualities owing to anomalous emission without degrading the brightness thereof.

A sheet-like light source device as illustrated in FIGS. 5 and 6 is conventionally used a backlight in a liquid crystal display device. Such a conventional sheet-like light source device is composed of a lamp 21 serving as a rod-like light source, a lamp reflector 22 serving as a tubular reflecting member, a light-conducting plate 23, and a reflecting sheet 24 serving as a planar reflecting member. The lamp 21 is mainly comprises a cold-cathode fluoresent lamp (CCFL), and light emitted from the lamp 21 is made incident on the light-conducting plate 23, either directly or via the lamp reflector 22. A transparent material is used as the light-conducting plate 23, and polymethyl methacrylate (PMMA), polycarbonate (PC) or glass exhibiting high transmission rate of light is generally used.

As illustrated in FIG. 6, light which is made incident on a light-incident surface 23a of the light-conducting plate 23 is spread through the light-conducting plate 23 to a side opposite of the lamp while repeating total reflection through a difference in refractive indices of acrylic resin and air. All of light made incident from the light-incident surface 23a of the light-conducting plate 23 will satisfy a total reflection condition and will not be emitted from a front surface 23b or a rear surface 23c of the light-conducting plate 23. The rear surface 23c of the light-conducting plate 23 is thus devised to emit light therefrom to the front surface 23b, which is generally achieved by forming a scattering portion (not shown) mainly through white printing. Light will be scattered when hitting against this scattering portion to thereby break the total reflection condition of light within the light-conducting plate 23 so that light will be emitted from the front surface 23b which is a display surface side of the light-conducting plate 23. This scattering portion is made of a material which does not perform absorption, but performs only scattering of light. Light which that has been scattered at the scattering portion will be also scattered to the rear surface 23c which is a non-display surface side of the light-conducting plate 23 so that the reflecting sheet 24 is placed on the rear surface 23c for reflecting this light to the front surface 23b on the display surface side. The reflecting sheet 24 is generally disposed to extend to the interior of the lamp reflector 22 as illustrated in FIG. 6.

While light which is made incident on the light-incident surface 23a, which is a surface end portion on the lamp 21 side of the light-conducting plate 23, shall ideally be spread by entering the light-conducting surface 23 and through total reflection in the above-described manner, light might slightly penetrate from portions A of the front surface 23b and the rear surface 23c proximate to the light-incident surface 23a exposed to the interior of the lamp reflector 22 in actual conditions. Light which is made incident from the portions A of the front surface 23b and the rear surface 23c will not satisfy the total reflection condition within the light-conducting plate 23 but will remarkably degrade display qualities owing to generation of anomalous emission (emission line) on the display surface proximate to the lamp 21.

For reducing anomalous emission (emission line) in the proximity of the lamp 21, it has been conventionally disclosed for a technique as one example for reducing light made incident from the rear surface 23c, for instance, in Japanese Unexamined Patent Publication No. 304627/1997, in which a reflecting sheet 24 is made to project from the light-conducting plate 23 within the lamp reflector 22 as illustrated in FIG. 7. However, the rate of light which has entered in a space 22a on a rear surface side of the reflecting sheet 24 projecting within the lamp reflector 22 and which will again be reflected is small, and thus light which has entered in the space 22a will mostly be useless.

Japanese Unexamined Patent Publication No. 112214/1998 further discloses a technique for reducing the amount of light made incident from the portions A of the front surface 23b and the rear surface 23c wherein the lamp reflector 22 is made to jut out by a minute distance in a direction parallel to the display surface of the light-conducting plate 23. However, the light-incident surface 23a might be exposed when relative positions of the light-conducting plate 23 and the lamp reflector 22 are shifted from designed values owing to assembling errors or application of force, which also leads to remarkable degradations in display qualities.

The present invention has been made for the purpose of solving these problems, and it provides a sheet-like light source device capable of preventing degradations in display qualities owing to anomalous emission without degrading the brightness thereof.

SUMMARY OF THE INVENTION

In accordance with the present invention, there is provided a sheet-like light source device of side-light type comprising a light-conducting plate made of a light-transmitting material, at least one rod-like light source disposed proximate to a light-incident surface comprising at least one lateral side end portion of the light-conducting plate, a tubular reflecting member covering portions other than a surface facing the light-conducting plate of the rod-like light source, and a planar reflecting member disposed proximate to a position facing a rear surface of the light-conducting plate, wherein an end portion of the planar reflecting member is projecting out from an end portion of the light-conducting plate within the tubular reflecting member, and wherein the projecting end portion of the planar reflecting member is bent in a parting direction from the rod-like light source.

It is preferable that the projecting end portion of the planar reflecting member is bent within an interior of the tubular reflecting member.

It is preferable that the projecting end portion of the planar reflecting member is bent upwardly back and that an edge of the projecting end portion is abutting against the light-incident surface of the light-conducting plate.

It is further preferable that a throttle is formed on an aperture into which the light-conducting plate of the tubular reflecting member is inserted, that the projecting end portion of the planar reflecting member is bent downwardly back, and that the edge of the projecting end portion is abutting against an inner surface of the throttle of the tubular reflecting member.

It is preferable that the bent back portion on the projecting end portion of the planar reflecting member is adhered to an opposing portion of the planar reflecting member.

In accordance with the present invention, there is further provided a sheet-like light source device of side-light type comprising a light-conducting plate made of a light-transmitting material, at least one rod-like light source disposed proximate to a light-incident surface comprising at least one lateral side end portion of the light-conducting plate, a tubular reflecting member covering portions other than a surface facing the light-conducting plate of the rod-like light source, and a planar reflecting member disposed proximate to a position facing a rear surface of the light-conducting plate, wherein the tubular reflecting member is jutting out by a specified distance in parallel to the light-conducting plate to the rod-like light source side, and wherein a distance between a bend end portion of the tubular reflecting member and a rear surface of the tubular reflecting member on the rod-like light source side is set to be at most equal to an outer diameter of a shock absorbing member disposed around the rod-like light source.

DETAILED DESCRIPTION

The sheet-like light source device according to the present invention will now be explained in details with reference to the drawings.

EMBODIMENT 1

Figure 1:
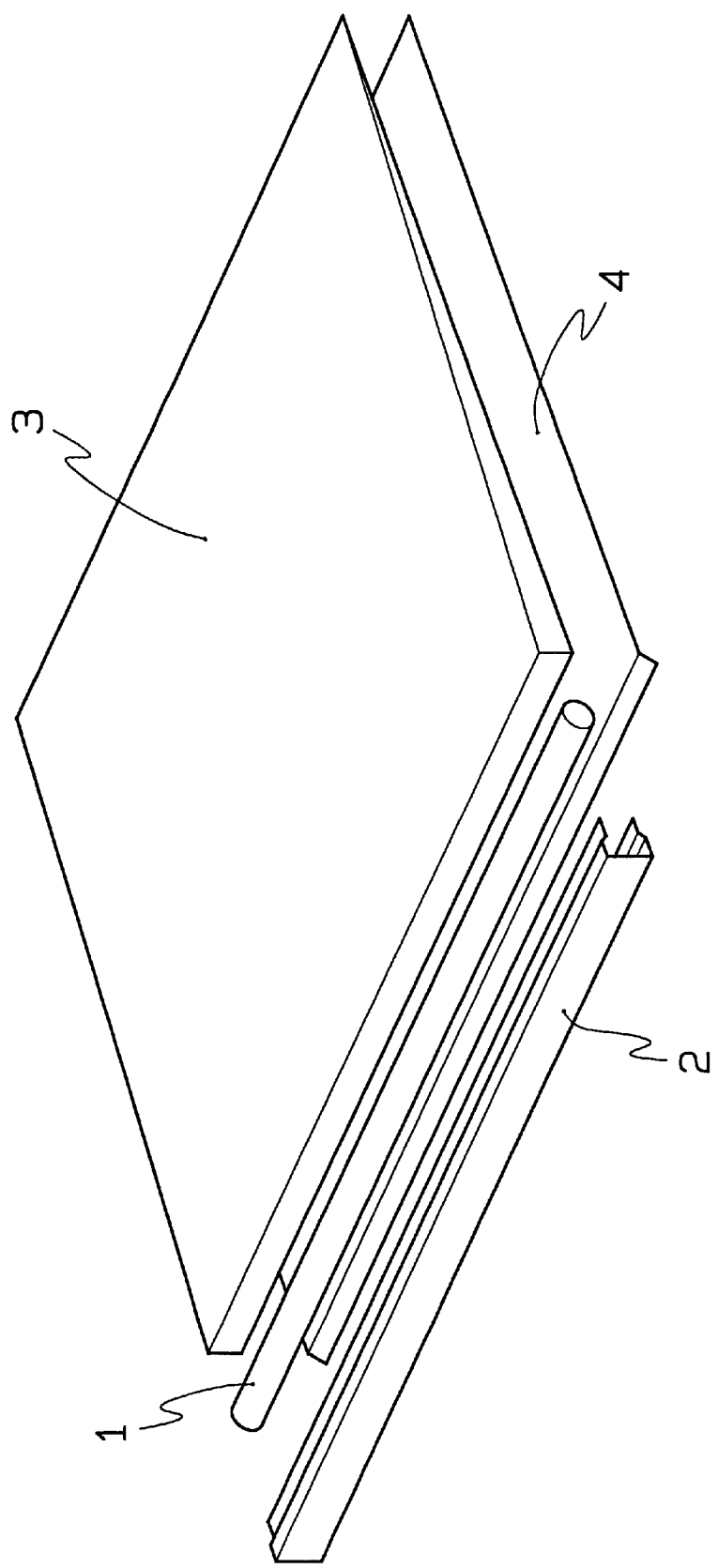
FIG. 1 is an exploded perspective explanatory view showing one embodiment of a sheet-like light source device of the present invention.
Figure 2:
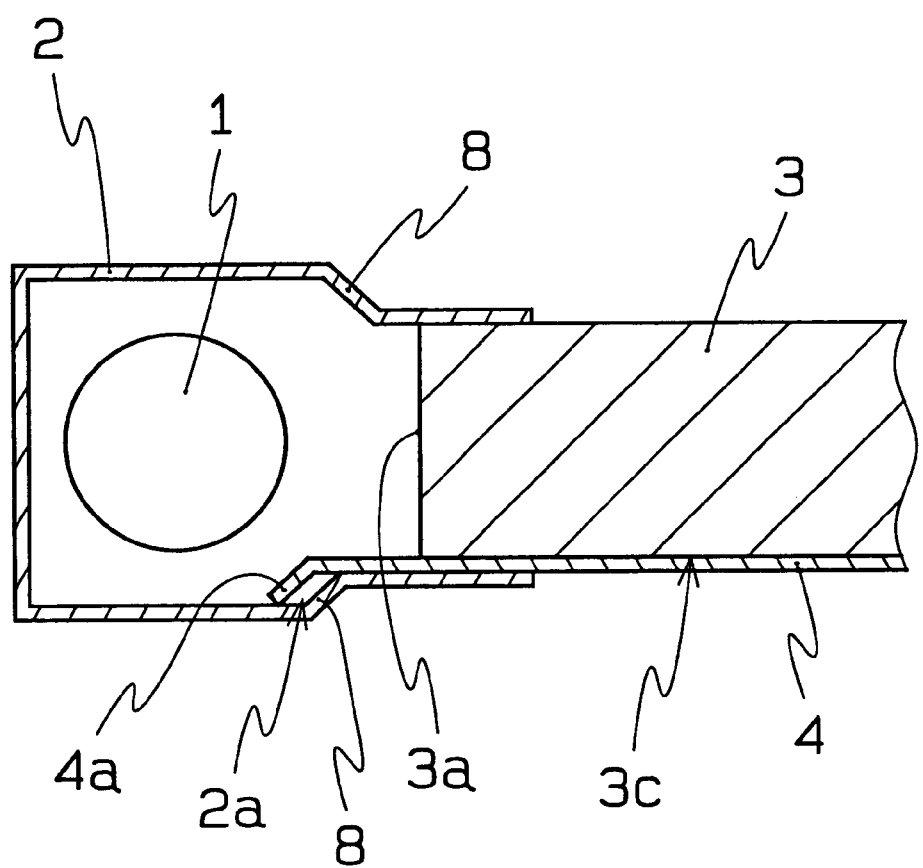
FIG. 2 is a sectional explanatory view showing a portion proximate to a side surface of a light-conducting plate of FIG. 1.

The sheet-like light source device as illustrated in FIGS. 1 to 2 is a side-light type sheet-like light source device comprising a light-conducting plate 3 made of transparent material, at least one lamp 1 disposed in proximity to a light-incident surface 3a which is at least one lateral end portion of the light-conducting plate 3, a lamp reflector 2 covering portions other than a surface of the lamp 1 opposing the light-conducting plate 3, and a reflecting sheet 4 disposed in proximity to a position opposing a rear surface 3c of the light-conducting plate 3.

Similar to a conventional arrangement, the lamp 1 is generally formed of a cold-cathode fluoresent lamp (CCFL) and light emitted from the lamp 1 is made incident to the light-conducting plate 3 either directly or via the lamp reflector 2. The light-conducting plate 3 is made of a transparent material, and polymethyl methacrylate (PMMA), polycarbonate (PC) or glass with a high transmission rate of light is generally employed.

Since the end portion of the reflecting sheet 4 is projecting out from the end portion of the light-conducting plate 3 within the lamp reflector 2 in the sheet-like light source device according to the illustrated embodiment, it is possible to reduce anomalous emission (emission line) proximate of the lamp 1. Since the projecting end portion 4a of the reflecting sheet 4 is bent in a parting direction from the lamp 1, it is possible to prevent penetration of light from the lamp 1 through a space portion 2a formed between the end portion 4a and the lamp reflector 2, and thus to prevent degradations in brightness. It is preferable that the bent end portion 4a of the reflecting sheet 4 abuts an inner surface of the lamp reflector in view of preventing entrance of light into the space portion 2a. It is further desirable to provide a throttle portion 8 of the lamp reflector 2 closer to the lamp 1 side than the lateral surface 3a of the light-conducting plate 3 on the lamp 1 side to avoid a clearance from being formed between the light-conducting plate 3 and the reflecting sheet 4. Due to similar reasons, it is desirable to dispose the throttle portion 8 on the opposite side on the lamp 1 side for avoiding exposure of an upper surface of the light-conducting plate. While an additional throttle portion 8 of the lamp reflector 2 is provided on an upper surface portion of the light-conducting plate in the illustrated embodiment, it is also possible to omit this throttle portion 8, and the upper surface of the lamp reflector 2 might be a planar surface. It is further possible to arbitrarily set a degree of projection of the reflecting sheet 4 as long as the reflecting sheet 4 is projecting from the light-conducting plate within the lamp reflector 2, while this range is selected such that the reflection sheet 4 does not contact the lamp 1.

EMBODIMENT 2

Figure 3:
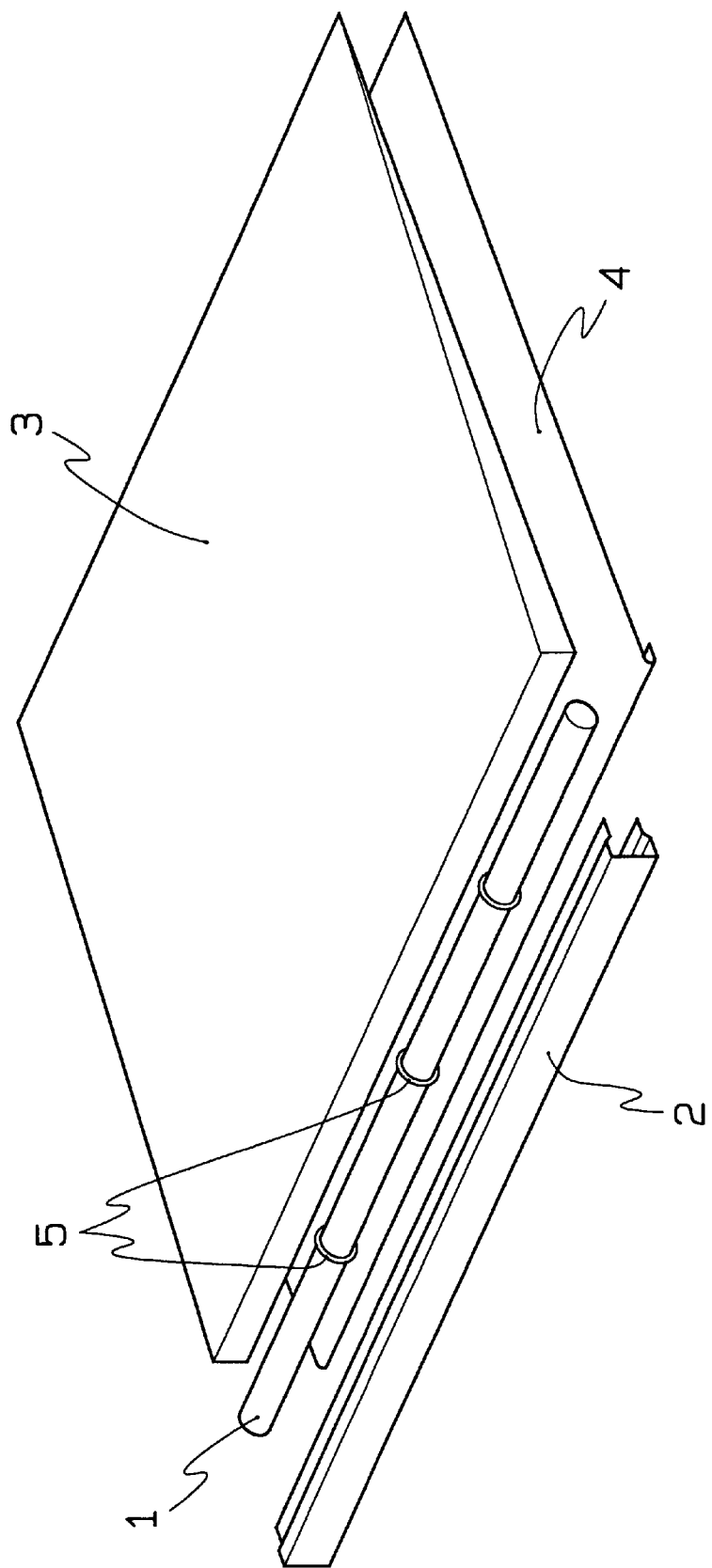
FIG. 3 is an exploded perspective explanatory view showing another embodiment of the sheet-like light source device of the present invention.
Figure 4:
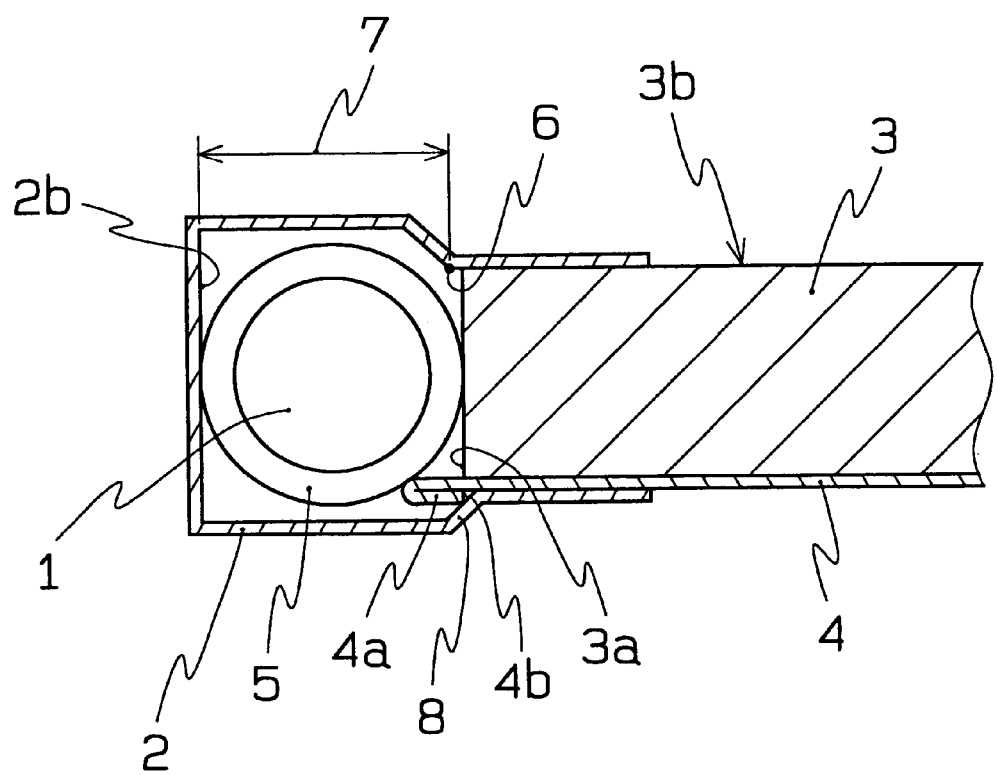
FIG. 4 is a sectional explanatory view showing a portion proximate to a side surface of the light-conducting plate of FIG. 3.
Figure 5:
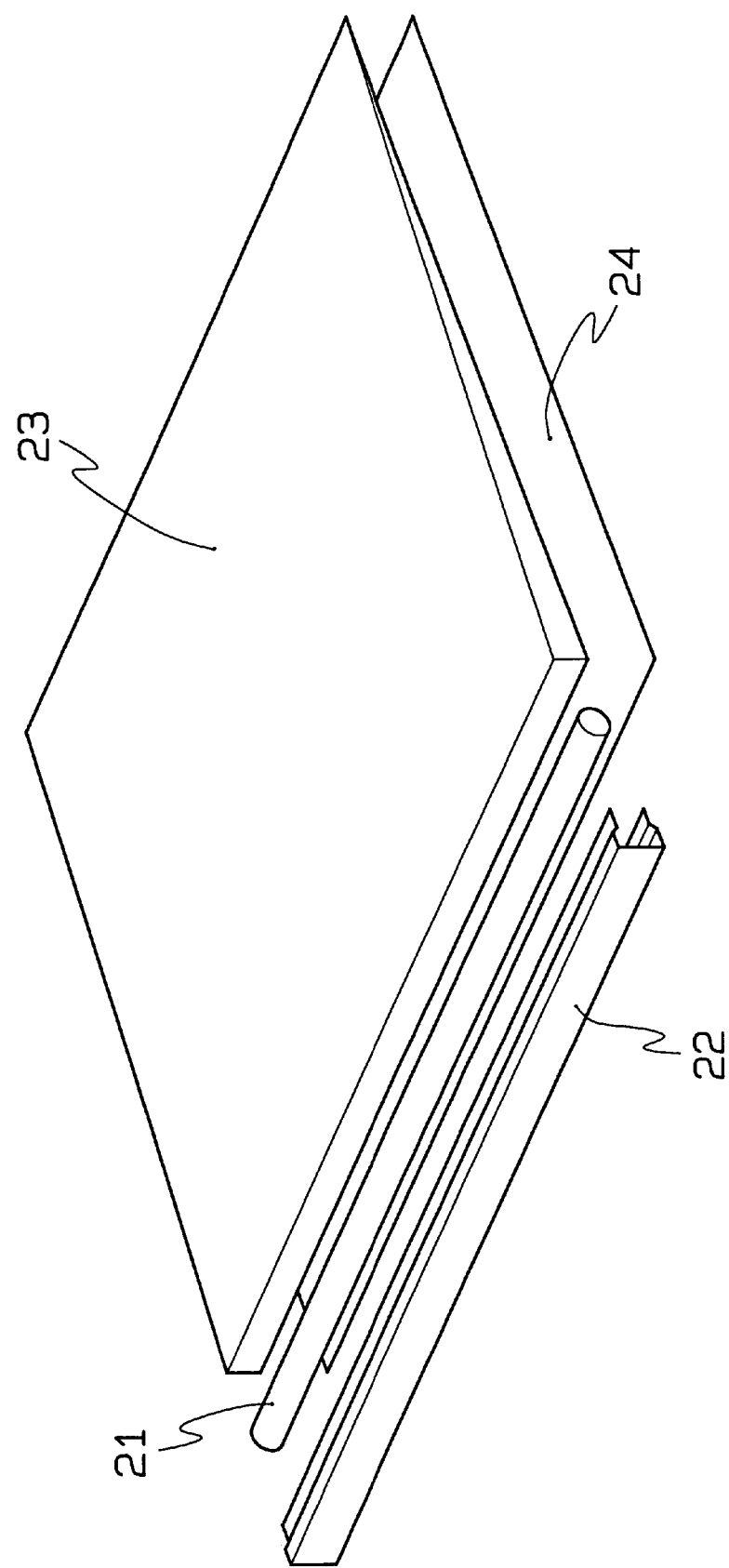
FIG. 5 is an exploded perspective view of one example of a conventional sheet-like light source device.
Figure 6:
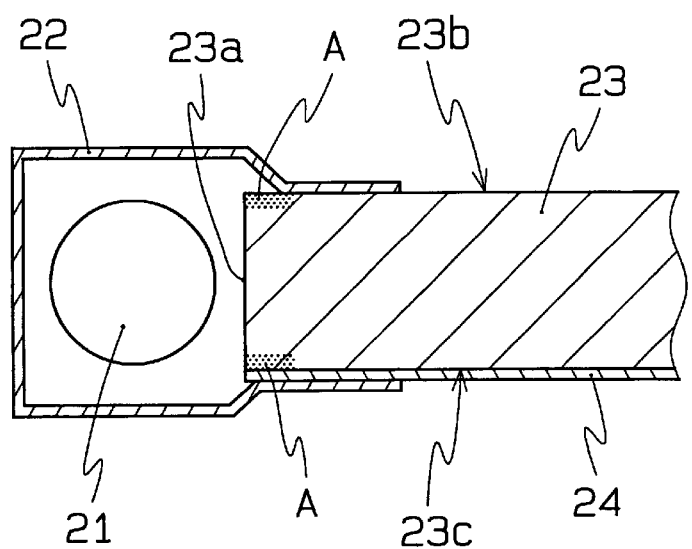
FIG. 6 is a partially enlarged perspective view of a light-conducting plate of FIG. 5.
Figure 7:
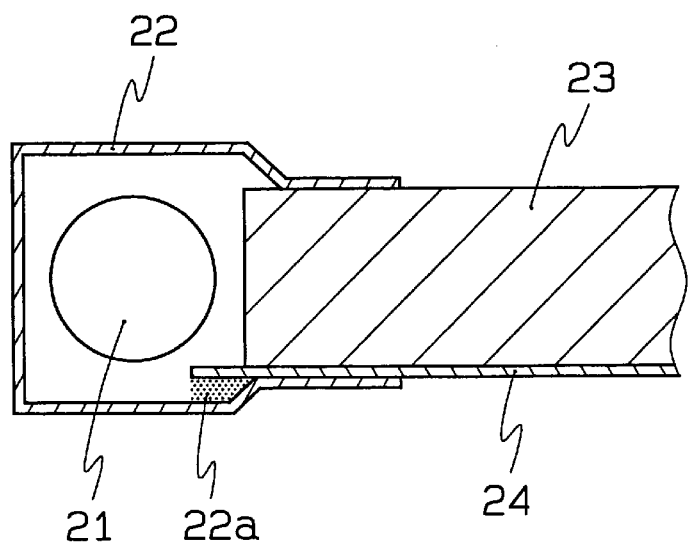
FIG. 7 is an exploded perspective view of another example of a conventional sheet-like light source device.

In another embodiment of the present invention as illustrated in FIGS. 3 and 4, the end portion 4a of the reflecting sheet 4 projecting inward to the lamp reflector 2 is bent back. With this arrangement, an edge 4b of the reflecting sheet 4 on the lamp side will face to a direction opposite to the lamp 1 so that it is possible to prevent penetration of light from the edge 4b into the interior of the reflecting sheet 4 to cause anomalous emission (emission line). Since the end portion 4a is bent downwardly back in FIGS. 3 and 4, the edge 4b might be abutted to an inner surface of a throttle 8 formed at an aperture of the lamp reflector 2 for easily performing positioning of the reflecting sheet 4.

Though not shown in the drawings, when the end portion 4a is bent upwardly back, easy positioning of the reflecting sheet 4 is enabled by making the edge 4b abut the light-incident surface 3a of the light-conducting plate 3.

In the illustrated embodiment, both of the front and rear reflecting surfaces of the projecting portion of the reflecting sheet 4 within the lamp reflector 2 will be exposed so that no degradations in brightness will be caused. While one might consider forming notches on a portion of the reflecting sheet 4 to be bent back, such notches are not favorable since they might be a cause of anomalous emission.

EMBODIMENT 3

Similarly to the above embodiment, the sheet-like light source device as illustrated in FIGS. 3 and 4 comprises a lamp 1, a lamp reflector 2, a light-conducting plate 3 and a reflecting sheet 4, wherein the lamp reflector 2 is arranged to be slightly projecting by a minute distance in a parallel manner from the light-conducting plate 3. In this case, a distance 7 between a bent back portion 6 of the reflector 2 and a reflecting surface 2b of the lamp reflector 2 opposite to the light-conducting plate side is set to be at most equal to an outer diameter of an O-ring 5 as a shock absorbing member. With this arrangement, an surface 3b of the light-conducting plate 3 on the display surface side will not be exposed to the interior of the lamp reflector 2 even though the light-conducting plate 3 might be pushed to a maximum extent in a direction of the lamp reflector 2. While the O-ring 5 is formed of elastic material exhibiting light-transmitting properties such as silicone rubber, this ring will be deformed when the light-conducting plate 3 is pushed inward at strong force, so that it is desirable to set the distance 7 to be less than the outer diameter of the O-ring 5 but to be larger than an outer diameter of the lamp 1.

According to the present invention, it is possible to prevent degradations in display qualities owing to anomalous emission without degrading the brightness thereof.

What is claimed is:

1. A sheet-like light source device of side-light type comprising a light-conducting plate made of a light-transmitting material, at least one rod-like light source disposed proximate to a light-incident surface comprising at least one lateral side end portion of the light-conducting plate, a tubular reflecting member covering portions other than a surface facing the light-conducting plate of the rod-like light source, and a planar reflecting member disposed proximate to a position facing a rear surface of the light-conducting plate, wherein an end portion of the planar reflecting member is projecting out from an end portion of the light-conducting plate within the tubular reflecting member, and wherein the projecting end portion of the planar reflecting member is bent in a parting direction from the rod-like light source.

2. The sheet-like light source device of claim 1, wherein the projecting end portion of the planar reflecting member is bent within an interior of the tubular reflecting member.

3. The sheet-like light source device of claim 2, wherein the projecting end portion of the planar reflecting member is bent upwardly back and that an edge of the projecting end portion is abutting against the light-incident surface of the light-conducting plate.

4. The sheet-like light source device of claim 2, wherein a throttle is formed on an aperture into which the light-conducting plate of the tubular reflecting member is inserted, that the projecting end portion of the planar reflecting member is bent downwardly back, and that the edge of the projecting end portion is abutting against an inner surface of the throttle of the tubular reflecting member.

5. The sheet-like light source device of any one of claims 2 to 4, wherein the bent back portion on the projecting end portion of the planar reflecting member is adhered to an opposing portion of the planar reflecting member.

6. A sheet-like light source device of side-light type comprising a light-conducting plate made of a light-transmitting material, at least one rod-like light source disposed proximate to a light-incident surface comprising at least one lateral side end portion of the light-conducting plate, a tubular reflecting member covering portions other than a surface facing the light-conducting plate of the rod-like light source, and a planar reflecting member disposed proximate to a position facing a rear surface of the light-conducting plate, wherein the tubular reflecting member is jutting out by a specified distance in parallel to the light-conducting plate to the rod-like light source side, and wherein a distance between a bend end portion of the tubular reflecting member and a rear surface of the tubular reflecting member on the rod-like light source side is set to be at most equal to an outer diameter of a shock absorbing member disposed around the rod-like light source.

* * * * *